United States Patent
Kassis et al.

(10) Patent No.: US 11,169,120 B2
(45) Date of Patent: Nov. 9, 2021

(54) METHOD FOR THE ULTRASOUND DETECTION AND CHARACTERIZATION OF DEFECTS IN A HETEROGENEOUS MATERIAL

(71) Applicant: Electricité de France, Paris (FR)

(72) Inventors: Paul Kassis, Paris (FR); Nicolas Paul, Montreuil (FR)

(73) Assignee: Electricite de France

( * ) Notice: Subject to any disclaimer, the term of this patent is extended or adjusted under 35 U.S.C. 154(b) by 0 days.

(21) Appl. No.: 17/272,844

(22) PCT Filed: Sep. 2, 2019

(86) PCT No.: PCT/FR2019/052016
§ 371 (c)(1),
(2) Date: Mar. 2, 2021

(87) PCT Pub. No.: WO2020/049247
PCT Pub. Date: Mar. 12, 2020

(65) Prior Publication Data
US 2021/0310991 A1  Oct. 7, 2021

(30) Foreign Application Priority Data
Sep. 3, 2018 (FR) .................................. 1857907

(51) Int. Cl.
*G01N 29/06* (2006.01)
*G01N 29/26* (2006.01)
(52) U.S. Cl.
CPC ......... *G01N 29/069* (2013.01); *G01N 29/262* (2013.01); *G01N 2291/106* (2013.01)
(58) Field of Classification Search
USPC ........................................................ 702/39
See application file for complete search history.

(56) References Cited

U.S. PATENT DOCUMENTS

| | | | | |
|---|---|---|---|---|
| 4,137,779 A | * | 2/1979 | Wustenberg | G01N 29/2487 73/627 |
| 2017/0059528 A1 | * | 3/2017 | Seong | G01N 29/069 |

(Continued)

FOREIGN PATENT DOCUMENTS

WO   2016083759 A1   6/2016

OTHER PUBLICATIONS

French Search Report for Application No. FR1857907 dated May 28, 2019.

(Continued)

*Primary Examiner* — Paul D Lee
(74) *Attorney, Agent, or Firm* — Lerner, David, Littenberg, Krumholz & Mentlik, LLP (57) ABSTRACT

The invention concerns a method for the ultrasound detection and characterisation of defects in a heterogeneous material, comprising the following steps:
  for each of a plurality of probe positions (z), for a plurality of configurations of the multi-element probe (1), emitting ultrasound by at least one emitting transducer (14) and acquiring a measurement signal by at least one receiving transducer (15),
  implementing a focusing algorithm and obtaining, for each probe position (z) an image in which each pixel of the image represents a probed point (w) of the material with which a focused amplitude is associated,
  for each probed point (w), determining a measurement of central tendency of the amplitude and a function representative of the variability of the amplitude,
  for each image, correcting the amplitude,
  detecting and characterising defects in the material based on the corrected images.

12 Claims, 4 Drawing Sheets

(56) References Cited

U.S. PATENT DOCUMENTS

2017/0328871 A1    11/2017  Paul et al.
2018/0299412 A1*   10/2018  Mendes Rodrigues .....................
                                                    G01N 29/4454

OTHER PUBLICATIONS

International Search Report including Written Opinion for Application No. PCT/FR2019/052016 dated Dec. 5, 2019.
Mjiki et al., "Total Focusing Method for Non Destructive Evaluation: Toward Real-Time Imaging Systems", IEEE, Aug. 4, 2003, pp. 1164-1167.
Wilhjelm et al., "Some Imaging Strategies in Multi-Angle Spatial Compounding", 2000 IEEE Ultrasonics Symposium, Oct. 22, 2000, vol. 2, pp. 1615-1618.

* cited by examiner

METHOD FOR THE ULTRASOUND DETECTION AND CHARACTERIZATION OF DEFECTS IN A HETEROGENEOUS MATERIAL

CROSS-REFERENCE TO RELATED APPLICATIONS

The present application is a national phase entry under 35 U.S.C § 371 of International Application No. PCT/FR2019/052016 filed Sep. 2, 2019, which claims priority from French Application No. 1857907 filed Sep. 3, 2018, all of which are hereby incorporated herein by reference.

GENERAL TECHNICAL FIELD AND BACKGROUND ART

The present invention relates to the non-destructive testing of materials, and more precisely to the detection and characterisation by ultrasound of defects in a heterogeneous material.

Ultrasound is commonly used for implementing non-destructive testing of materials. To do this, an ultrasonic transducer positioned at the surface of the material to be examined is used, that emits ultrasonic waves in the material. These waves propagate in the material and are reflected by the latter according to its structure. The transducer receives these reflected waves, and the analysis thereof permitting to detect any defects in the material.

However, for a heterogeneous material, i.e. a polycrystalline material of which the grain size is about the ultrasonic wavelength in this material, the phenomenon of diffusion of the ultrasonic wave by the structure of the material becomes preponderant. This diffusion can then lead to the generating of a structure noise, i.e. to an ultrasonic signal with a non-negligible amplitude received by the transducer and having characteristics that are similar to those that a wave reflected by a defect would emit, thus resulting in a deterioration of the capacity for detecting defects that are actually present in the material.

Indeed, since the structure noise has time and spectral characteristics that are similar to those of the defect signatures that form the useful signal, the conventional approaches for processing ultrasonic signals, by time or frequency filtering, deconvolution or projection on wavelet bases are ineffective.

Patent application US 2007/0006651 A1 describes a method of non-destructive testing using ultrasonic waves, based on comparing the amplitude of the frequency spectrum of a selection of the signal with a reference amplitude. This application mentions the possibility of taking measurements at different positions and mentions combining these measurements in order to obtain an average measurement signal in the spatial direction. However, such a method does not provide complete satisfaction, and the signal remains tainted with noise.

Patent application WO2016083759 describes a method for the ultrasound detection and characterisation of defects in a heterogeneous material, comprising the following steps:
emitting ultrasounds from an ultrasonic emiemitting transducer positioned against the material,
acquiring by an ultrasonic receiving transducer in different positions with respect to said material a plurality of time-dependent signals representative of the amplitude of the ultrasounds propagated in the material as a function of time for a position of the ultrasonic receiving transducer,
determining a time-dependent function representative of a spatially-averaged power of the time-dependent signals corresponding to different positions of the ultrasonic receiving transducer, the time-dependent function representative of the spatially-averaged power of the time-dependent signals having general formula:

$$f(t) = \left(\beta \sum_z |x(z, t) - m(t)|^\alpha\right)^\gamma$$

with $\alpha$, $\beta$ and $\gamma$ different from zero, $x(z,t)$ the time-dependent signal representative of the amplitude of the sound propagated in the material as a function of time for a position $z$ of the ultrasonic receiving transducer, and $m(t)$ a function of time,
normalising the time-dependent signals using said time-dependent function in order to obtain normalised time-dependent signals,
detecting and characterising defects of the material from said normalised time-dependent signals.

Patent application WO2016083759 thus describes a pre-processing that makes use of a time-dependent function representative of a spatially-averaged power of the time-dependent signals corresponding to different positions of the ultrasonic receiving transducer. Such a pre-processing makes permits improving the detection and characterisation of defects in the material by homogenising the signals processed, so that the noise statistics are similar at the different measurement locations, facilitating the detection of an abnormal signal level. However, the measurement noise still exists and can sometimes limit the capacities of detecting and characterising a defect.

In fact, the method does not make use of all the capacities of a multi-element probe comprising a plurality of transducers, operating as an emitter or as a receiver. Indeed, the acquisition of measurement signals using such a multi-element probe gives rise to additional characteristics in the measurement signal that can be used to further improve the detecting and the characterising of defects in the material.

PRESENTATION OF THE INVENTION

The present invention has for purpose to propose a method for ultrasound detection of defects in a heterogeneous material that allows reducing the influence of the structure noise that taints the data collected.

To this end, it is proposed a method for the ultrasound detection and characterisation of defects in a heterogeneous material, comprising the following steps:
a) for each of a plurality of positions at the surface of the material,
a multi-element probe comprising a plurality of transducers is disposed at the position at the surface of the material;
for a plurality of configurations of the multi-element probe, ultrasound is emitted by at least one emitting transducer and at least one receiving transducer acquires a measurement signal representative of the amplitude of the ultrasound propagated in the material as a function of the time for this probe configuration at this position, the different configurations being distinguished from one another by different delays applied to the emission of ultrasonic waves by the transducers or by emitter or receiver functions fulfilled by different transducers, b) implementing a focusing algorithm on a measurement data set grouping together the measurement signals for the different configurations of the multi-element probe for each position of the multi-element probe, and obtaining for each probe position an image in which each pixel of the image represents a probed point of the material with which a focused amplitude is associated for said probed point on different probe positions, c) for each probed point, determining a measurement of central tendency of the focused amplitude at the probed point on different probe positions, d) for each probed point, determining a function representative of the variability of the focused amplitude at this probed point on different probe positions, e) for each image, correcting the focused amplitude at each probed point by subtracting the measure of central tendency from the amplitude and by dividing by the function representative of the variability, in order to obtain corrected images, f) detecting and characterising defects in the material based on the corrected images.

The invention is advantageously supplemented by the following characteristics, taken individually or in any technically possible combination thereof:

the different configurations can be distinguished from one another by emitter or receiver functions fulfilled by different transducers, and the focusing algorithm is a total focusing algorithm;

the different configurations can be distinguished from one another by different temporal offsets between transducers applied to the emission of ultrasonic waves by the transducers, and the focusing algorithm is a plane wave imaging;

the measure of central tendency is an average or a median;

the measure of central tendency is an average $A(w)$ having general formula:

$$A(w) = \beta \left( \sum_{i=1}^{N_s} \sum_{w_j \in V_w} I(z_i, w_j) \right)$$

with $N_s$ a number of images of different probe positions taken into account, Ns being greater than 2, $V_w$ a set of points around the point w that can be reduced to the point w, $I(z_i, w_j)$ being the amplitude or the absolute value of the focused amplitude at the probe position $z_i$ for the point $w_j$, with more preferably, $$\beta = \frac{1}{N_s} \text{ or } \beta = \frac{1}{N_s} \frac{1}{N_V}$$

or $\beta=1$, with $N_v$ the cardinal of the set of points $V_w$;

the measure of central tendency is an average $A(w)$ having general formula:

$$A(w) = \frac{1}{N_s} \frac{1}{N_V} \sum_{i=1}^{N_s} \sum_{w_j \in V_w} |I(z_i, w_j)|$$

with $N_s$ a number of images of different probe positions taken into account, Ns being greater than 2, $V_w$ a set of points around the point w that can be reduced to the point w, $I(z_i, w_j)$ being the amplitude at the probe position $z_i$ for the probed point $w_j$, and $N_v$ the cardinal of the set of points $V_w$;

the function $B(w)$ representative of the variability of the amplitude for this probed point w on the different probe positions, has general formula $$B(w) = \left( \beta' \sum_{i=1}^{N_s'} \sum_{w_j \in V_w'} |I(z_i, w_j) - A(w)|^{\alpha'} \right)^{\gamma'}$$

with $\alpha'$, $\beta'$ and $\gamma'$ different from zero, $N_s'$ a number of images of different probe positions, $V_w'$ a set of points around the point w that can be reduced to the point w, and $A(w)$ the measure of central tendency, and more preferably:

either $A(w)$ is the average, or $A(w)$ is the median over the set of points $V_w$, and either $\alpha'=2$ and $\gamma'=0.5$, or $\alpha'=1$ and $\gamma'=1$, and $$\beta' = \frac{1}{N_s'} \text{ or } \beta' = \frac{1}{N_s'-1} \text{ or } \beta' = \frac{1}{N_s'} \frac{1}{N_V'}$$

or $\beta'=1$, with $N_s'$ the number of positions z taken into account, $N_s'$ being greater than 2, and $N_v'$ the cardinal of the set $V_w'$ of points around the point w;

the function $B(w)$ representative of the variability of the amplitude at this probed point on the different probe positions has general formula $$B(w) = \sqrt{\frac{1}{N_s} \frac{1}{N_V} \sum_{i=1}^{N_s} \sum_{w_j \in V_w} ||I(z_i, w_j)| - A(w)|^2}$$

with $N_s$ a number of images of different probe positions, $V_w$ a set of points around the probed point w that can be reduced to the probed point w, $I(z_i, w_j)$ being the focused amplitude at the probe position $z_i$ for the probed point $w_j$, $N_v$ the cardinal of $V_w$, and $A(w)$ a measure of central tendency of the focused amplitude at the probed point on different probe positions;

the detection of defects comprises a step of spatial filtering of at least one corrected image by means of a bilateral filter, and of comparing with a threshold.

The invention also relates to a computer program product comprising program code instructions for the execution of the method according to the invention when said program is executed on a computer. Preferably, the computer program product takes the form of a non-transitory tangible medium that can be read by a computer, on which program code instructions are stored for the execution of the method according to the invention when the medium is read by a computer.

PRESENTATION OF THE FIGURES

The invention shall be better understood, thanks to the description hereinafter, which relates to a preferred embodiment, given as a non-limiting example and explained with reference to the accompanying diagrammatical drawings, wherein.

DETAILED DESCRIPTION

For the purposes of illustration, the following description will be given in the framework of the non-destructive testing of tubes using ultrasonic transducers. It often occurs that structures such as tubes have to be tested with a high accessibility constraint in an industrial context, for example for tubes disposed inside other structures. Thus, it is common that tubes can be tested only from the inside or from the outside, which results in the necessity of inspecting the entire thickness of the tube from a single face. Because the inspection can be carried out only from a single face, the depth to be inspected is then increased because of this, which also improves the influence of the structure noise.

Such an acquisition of measurements of transducers is commonly carried out, in particular for the implementation of the so-called TOFD technique (time of flight diffraction), of which the same acquisition protocol can be implemented for the present invention.

A common material for the tubes is for example inconel, i.e. an alloy with mainly a nickel, chrome, and iron base, and also containing copper, manganese and molybdenum, as well as optionally other components in generally lesser quantities. This is a heterogeneous material of which the structure has grains of a size comparable to the wavelength of the ultrasonic waves used in non-destructive testing. By way of example, the frequency of the ultrasonic waves generally used in non-destructive testing can range from 0.1 to 50 MHz, with the band 2-10 MHz being the most commonly used. The wavelength, in this band, is therefore comprised practically, for metals such as steel or aluminium, between 3 mm and 0.5 mm. Note that the method is not necessarily restricted to a heterogeneous material, but here is of an advantageous application.

Figure 2:
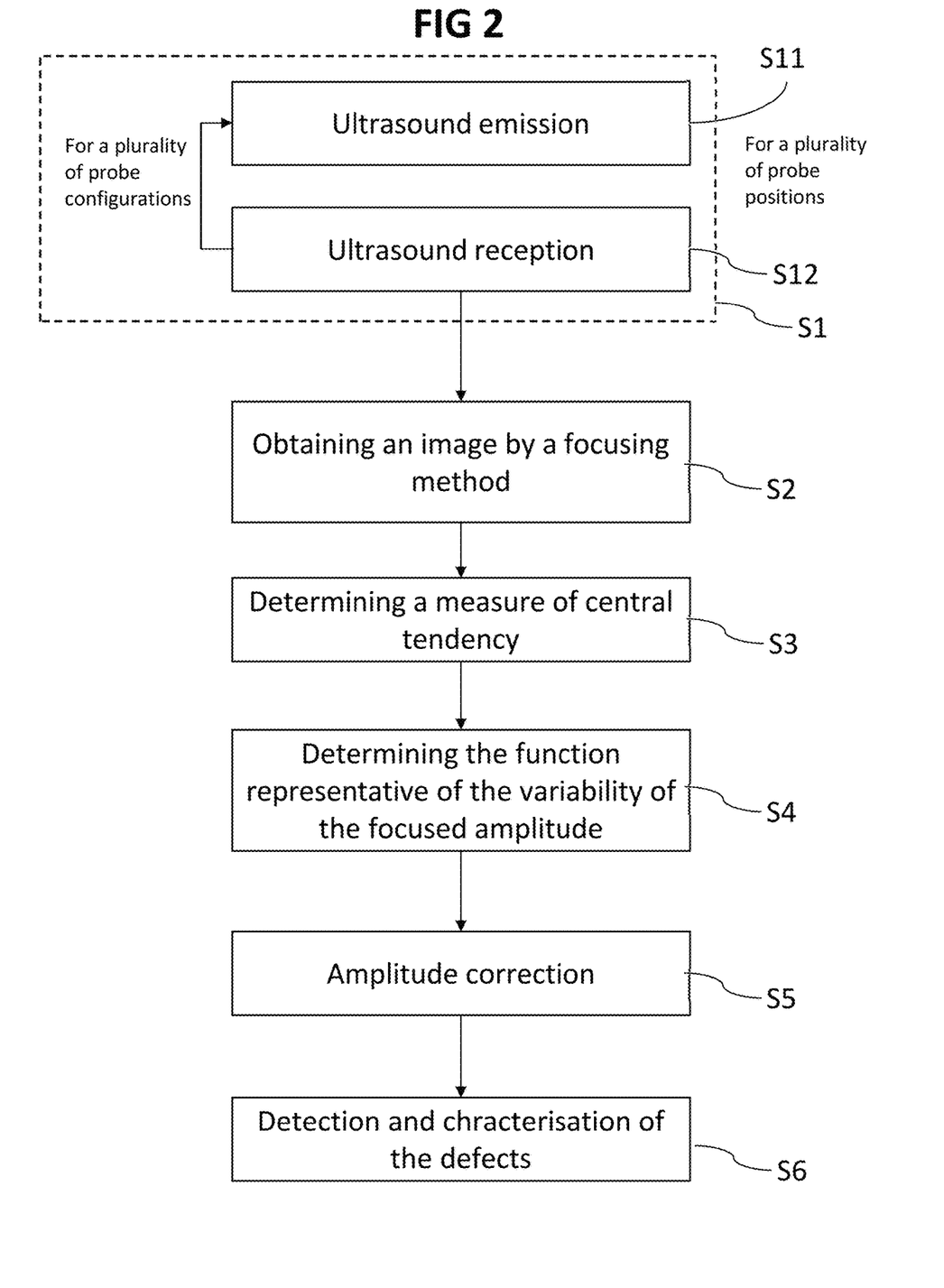
FIG. 2 is a diagram that diagrammatically shows steps of the method according to a possible embodiment of the invention.

A first step (step S1) of the method consists of acquiring a set of measurement data grouping together a measurement signal representative of the amplitude of the ultrasound propagated in the material as a function of time for several probe configurations at several positions of a multi-element probe 1.

Figure 1:
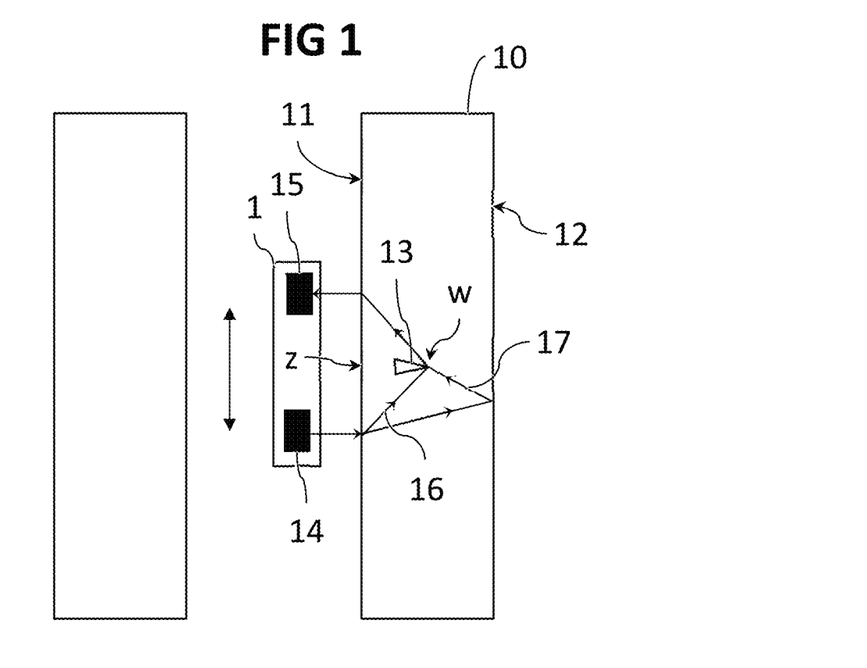
FIG. 1 shows the inspection of a tube by a multi-element probe.

In reference to FIG. 1, the acquisition is done by means of a multi-element probe 1 comprising a plurality of transducers 14, 15. The probe 1 is disposed facing the inner wall 11 of this tube 10, at a position z. The tube 10 has a defect 13, represented here in the form of a gash.

With a concern for simplification, only two transducers 14, 15 are shown here. In reality, the transducers 14, 15 are more numerous and have a spatial distribution that varies according to the intended applications and the surfaces to be inspected. The spatial distribution can for example be as a matrix, annular or forming a strip, for the most common, or have particular patterns. The plurality of transducers 14, 15 gives the possibility of focusing the emitted waves in the desired direction and at the desired depth. It is thus possible to inspect a plurality of probed points w. The spatial distribution of the transducers 14, 15 may not be plane, so as to conform to the surface to be inspected. It is common to use a coupling medium such as a sole or a layer of coupling gel, so as to favour the propagation of the ultrasound between the transducers 14, 15 and the material.

The multi-element probe 1 scans the surface of the material to be inspected, and therefore scans a plurality of positions z at the surface of the material. For example the multi-element probe 1 can scan the inner surface 11 of the tube 10 helically. The position z of the multi-element probe 1 at the surface 11 of the tube 10 can for example be expressed by a depth p and an angle θ, the positions z being spaced apart for example by less than one millimetre in altitude and by a few degrees (typically less than two degrees) in angle. Other ways of expressing the position z can be used according to the conformation of the surface to be inspected. In the case of a plane surface, the position could thus be expressed with an abscissa instead of the angle.

During an ultrasonic firing at a position z of the multi-element probe 1, one or several emitting transducers 14 emit (step S11) ultrasonic waves that penetrate into the tube 10 at its inner wall 11, then propagate in the material of said tube 10, before being received by another transducer 15, referred to as receiving transducer (step S12). In order to illustrate the propagation of the ultrasonic waves in the material, FIG. 1 shows a first travel 16 forming a short path for the ultrasonic waves, which are diffracted by the defect 13 in the direction of the receiving transducers 15, and a second travel 17, forms a long path for the ultrasonic waves, which are reflected by the outer wall 12 of the tube 10 in the direction of the defect 13 then join the receiving transducer 15.

At each position z of the multi-element probe 1, measurement signals are acquired according to different configurations of the multi-element probe 1. These different configurations can vary between them for example by the roles played by each one of the transducers 14, 15. In fact, the transducers 14, 15, can preferably alternatively play the role of emitter or the role of receiver. Thus, during an iteration at the same position z of the multi-element probe 1, a transducer 14, 15 can be an emitter, and become a receiver during another iteration.

A set of measurement data grouping together the measurement signal is obtained for each configuration for each probe position z. More precisely, for each probe position z, an acquisition matrix of coefficients x(z, n, i, j) is obtained each corresponding to the amplitude of the measurement signal x at instant nTe (Te being the sampling period) received by the transducer j when the transducer i emits ultrasonic waves.

A focusing method on the set of data is then implemented, in order to obtain (step S2) an image wherein each pixel of the image represents a probed point w of the material with which a focused amplitude is associated for said probed point w on different probe positions z, and which is not a function of time or of the configuration of the multi-element probe 1 (i.e. independently of which transducer 14, 15 is acting as emitter i or receiver j). The probed point w is a position in the material, which can be expressed for example as a vector with two or three spatial coordinates, typically expressed in a coordinate system related to the position z of the multi-element probe 1.

A common focusing method is the total focusing method commonly designated by the acronym TFM. In this approach, the different configurations can be distinguished from one another by emitter or receiver functions fulfilled by different transducers 14, 15. For example, in a first configuration, a first transducer 14 (or a first set of transducers 14) is individually excited with an electrical pulse signal so as to emit ultrasounds. These ultrasounds propagate in the material, and are then acquired by all the transducers 14, 15 (or by a second set of transducers 15). Then, at the same probe position z, another transducer 14 (or another first set of transducers 14) is individually excited with an electrical pulse signal so as to emit ultrasounds. These ultrasounds propagate in the material, and are then acquired by all the transducers 14, 15 (or by another second set of transducers 15). Preferably, each one of the transducers 14, 15 emits ultrasounds in at least one probe configuration at a position z. Typically each one of the transducers 14, 15 is in turn the sole emitting transducer, while all the transducers 14, 15 acquire the ultrasounds. There are then as many configurations as there are transducers 14, 15.

From the acquisition matrix of coefficients x(z, n, i, j), the calculation of the focused amplitude of the signal can be summarised by the following formula:

$$I(z, w) = \sum_{i=1}^{M} \sum_{j=1}^{M} g(x(z, h(w, i, j), i, j))$$

where M is the number of transducers 14, 15 of the multi-element probe 1, and h(w, i, j) is a function representative of the travel of the ultrasonic waves between the transducer i that emits these waves and the transducer j that receives them, passing through the probed point w. h(w, i, j) corresponds for example to the travel time (expressed as a number of samples) estimated for one ultrasonic wave:
- emitted by the transducer i,
- reflected by a point of the defect located at the probed point w, and
- acquired by the transducer j.

For example, this can be the estimated travel time of an ultrasonic wave using the short path 16 in FIG. 1 between the transducer 14 that emits and the transducer 15 that receives.

h(w, i, j) can also correspond to an estimated travel time for one ultrasonic wave:
- emitted by the transducer i,
- reflected by a bottom wall of the material, opposite the surface on which the multi-element probe 1 is arranged,
- reflected by a point of the defect located at the probed point w, and
- captured by the transducer j.

For example, this can be the estimated travel time of one ultrasonic wave using the long path 17 in FIG. 1 between the transducer 14 that emits and the transducer 15 that receives, which is reflected by the outer wall 12 of the tube 10. This type of travel is rather used for the defects that open onto the outer wall 12 of the tube 10.

These travel times can be estimated using speeds of the ultrasonic waves which depend on the frequency of the ultrasonic waves and on the nature of the material inspected, and also the type of propagation (transverse waves or longitudinal waves). Conversions of the propagation mode can also be considered during different reflections.

The function g is a function that can for example depend on the position of the probed point w or on the propagation speed of the wave. The function g can also be the absolute value function, or the analytical signal module. Those skilled in the art can for example refer to documents that have different total focusing methods. For example, the doctoral thesis in physics of Uduardo R. lopez Villaverde of April 2017 entitled "*Imagerie Ultrasonore dans des matériaux complexes par focalisation en tous points: Développement d'une méthode de débruitage des images basées sur la décomposition de l'opérateur de retournement temporel*", describes a recent state of the art of certain total focusing methods.

In the simplest case the focused amplitude of the signal at the probed point w for the probe position z can be written:

$$I(z, w) = \sum_{i=1}^{M} \sum_{j=1}^{M} x(z, h(w, i, j), i, j) \text{ or}$$

$$I(z, w) = \sum_{i=1}^{M} \sum_{j=1}^{M} |x(z, h(w, i, j), i, j)|$$

An image is thus obtained for each position z wherein each pixel of the image represents a probed point w of the material with which a focused amplitude I(z,w) is associated.

Another focusing method is the plane wave imaging method, often designated by PWI. In this approach, the different configurations can be distinguished from one another by different delays applied to the emission of ultrasonic waves by the emitting transducers 14, 15. The PWI method is based on the emission of plane waves by exciting all the transducers 14, 15 unisequentially, which makes it possible to orient and increase the amplitude of the incident field in the desired directions. An incident plane wave is formed by exciting all or a portion of the transducers 14, 15 with a temporal offset between the transducers 14, 15. By changing the temporal offset between the emissions of the transducers, the angle of propagation Ok of the plane wave is modified. The different configurations use different angles of propagation Ok, obtained by different temporal offsets, i.e. different delays applied to the emission of ultrasonic waves. The transducers 14, 15 then each acquire a measurement signal representative of the amplitude of the ultrasound propagated in the material. The measurement signals received at each ultrasonic firing are focused at reception at all points inspected.

Due to the fact that the transducers 14, 15 emit ultrasound with temporal offsets in such a way as to emit a plane wave in the material, this plane wave has an angle of propagation that depends on the temporal offset between the transducers. By varying this temporal offset between transducers 14, 15, plane waves can be emitted with different angles of propagation.

From an acquisition matrix of coefficients x(z, n, $\theta_k$, j), the calculation of the focused amplitude of the signal can then be summarised by the following formula:

$$I(z, w) = \sum_{\theta_k=1}^{N_\theta} \sum_{j=1}^{M} g(x(z, h(w, \theta_k, j), \theta_k, j))$$

where M is the number of transducers 14, 15 of the multi-element probe 1, $\theta_k$ is the angle of propagation (or angle of incidence) of the plane wave emitted, No being the number of angles of propagation, and therefore of different temporal offsets, and h(w, $\theta_k$, j) is a function representative of the travel of the plane wave of angle of propagation $\theta_k$ to the transducer j that receives it, passing through the probed point w. $h(w, \theta_k, j)$ corresponds for example to the travel time (expressed as a number of samples) estimated for:

one plane wave emitted by the transducers 14, 15 with an angle $\theta_k$ reflected by a point of the defect located at the probed point w, and acquired by the transducer j (note that the wave between the defect and the transducer j is no longer plane).

As hereinabove, the travel times can be estimated from the speeds of the ultrasonic waves which depend on the frequency of the ultrasonic waves and on the nature of the material inspected, and also on the type of propagation (transverse waves or longitudinal waves). Likewise, the function g is a function that can for example depend on the position of the probed point w or on the propagation speed of the wave.

In the simplest case the focused amplitude of the signal at the probed point w for the probe position z can be written:

$$I(z, w) = \sum_{\theta_k=1}^{N_\theta} \sum_{j=1}^{M} x(z, h(w, \theta_k, j), \theta_k, j) \text{ or}$$

$$I(z, w) = \sum_{\theta_k=1}^{N_\theta} \sum_{j=1}^{M} |x(z, h(w, \theta_k, j), \theta_k, j)|$$

Regardless of the approach chosen, there is then for each probe position z an image in which each pixel of the image represents a probed point w of the material with which a focused amplitude is associated for said probed point w on different probe positions z.

Note that the image can be in two dimensions (if w is of dimension 2) or in three dimensions (if w is of dimension 3). The detecting then the characterising of a defect is then carried out from the values taken by this focused amplitude $I(z,w)$, typically from the absolute value $|I(z,w)|$ of this focused amplitude. For the purposes of clarity and simplification, reference hereinafter to the focused amplitude $I(z, w)$ will indifferently designate said focused amplitude $I(z,w)$ or its absolute value $|I(z,w)|$.

The structure noise observed on the images coming from TFM has a spatial inhomogeneity: the extent of the structure noise varies according to the location of the probed points w. In particular, it tends to be higher in the vicinity of the transducers 14, 15. It is therefore proposed to proceed with a post-processing of the images obtained aiming to homogenise then to reduce the structure noise, so as to improve the detecting and the characterising of the defects.

The post-processing proposed is based on making use of statistics drawn from the multiplicity of the data available for the same probed point w, due to the fact that information on the same probed point w in the material appears in different images concerning different positions z.

The following step (step S3) consists in determining, for each probed point w, a measure of central tendency, noted as $A(w)$ of the focused amplitude $I(z,w)$ at the probed point w on different positions z of the multi-element probe 1. Typically, the measure of central tendency $A(w)$ is an average or a median. Preferably, the measure of central tendency is an average $A(w)$ having general formula:

$$A(w) = \beta \left( \sum_{i=1}^{N_s} \sum_{w_j \in V_w} I(z_i, w_j) \right)$$

with $N_s$ a number of images of different probe positions z taken into account, Ns being greater than 2, $V_w$ a set of points around the probed point w that can be reduced to the probed point w, $I(z_i, w_j)$ being the focused amplitude or the absolute value of the amplitude at the position $z_i$ for the probed point $w_j$. For example, $$\beta = \frac{1}{N_s} \text{ or } \beta = \frac{1}{N_s} \frac{1}{N_V}$$

or $\beta=1$, with $N_v$ the cardinal of the set of points $V_w$.

The set of points $V_w$ includes the probed point w, and is more preferably centred around the probed point w. Its size is chosen according to the characteristics of the structure noise and of the images used. For example, the set of points $V_w$ can be chosen as all the greater as the number of images $N_s$ of different probe positions z taken into account is small. Indeed, taking the vicinity of the probed point w into account makes it possible to calculate the measure of central tendency on enough points and thus to obtain a bester estimation of the measurement of central tendency. However, the set of points $V_w$ preferably groups together less than 100 points around the probed point w, so as to retain the local aspect of the measure of central tendency, which has to remain representative of the focused amplitude at the probed point w, i.e. at the immediate approaches thereof. Inversely, if the number of images $N_s$ of different probe positions z taken into account is substantial enough, the set of points $V_w$ can be reduced, until it corresponds to only the probed point w (in which case $N_v$ is equal to 1).

Preferably, $$\beta = \frac{1}{N_s} \frac{1}{N_V}$$

and it is the absolute value of the focused amplitude that is used, which gives:

$$A(w) = \frac{1}{N_s} \frac{1}{N_V} \sum_{i=1}^{N_s} \sum_{w_j \in V_w} |I(z_i, w_j)|$$

The following step (step S4) consists of determining, for each probed point w, a function $B(w)$ representative of the variability of the focused amplitude at this probed point w on the different positions z of the multi-element probe 1. The function $B(w)$ typically has general formula:

$$B(w) = \left( \beta' \sum_{i=1}^{N_s'} \sum_{w_j \in V_w'} |I(z_i, w_j) - A(w)|^{\alpha'} \right)^{\gamma'}$$

with $\alpha'$, $\beta'$ and $\gamma'$ different from zero, $N_s'$ a number of images of different probe positions z, $V_w'$ a set of points around the probed point w that can be reduced to the probed point w, $N_{v'}$ the cardinal of $V_w'$. Preferably, I(z,w) here designates the absolute value of the focused amplitude.

For the set of points $V_w'$, the same considerations as for the set of points $V_w$ used to determine the function A(w) apply. Note that although the set of points $V_w'$ used to determine the function B(w) can be different from the set of points $V_w$ used to determine the function A(w), it is preferable for reasons of coherence to take the same set of points, and therefore preferably $V_w'=V_w$ and $N_v'=N_v$.

Preferably:
either $\alpha'=2$ and $\gamma'=0.5$, or $\alpha'=1$ and $\gamma'=1$, and $$\beta' = \frac{1}{N_s'} \text{ or } \beta' = \frac{1}{N_s'-1} \text{ or } \beta' = \frac{1}{N_s'}\frac{1}{N_V'}$$

or $\beta'=1$, with $N_s'$ the number of positions z taken into account, $N_s'$ being greater than 2, and $N_v$ the cardinal of the set $V_w$ of points around the probed point w.

Preferably:

$$B(w) = \sqrt{\frac{1}{N_s}\frac{1}{N_V}\sum_{i=1}^{N_s}\sum_{w_j \in V_w} ||I(z_i, w_j)| - A(w)|^2}$$

Once the measure of central tendency A(w) of the focused amplitude I(z,w) and the function B(w) representative of the variability of the focused amplitude I(z,w) have been determined, it is possible to correct (step S5) on each image the amplitudes associated with the probed point w considered. This correction is made by subtracting the measure of central tendency A(w) from the focused amplitude I(z,w) and by dividing by the function B(w) representative of the variability. A corrected amplitude $I_c(z,w)$ is thus obtained $$I_c(z,w)=(I(z,w)-A(w))/B(w)$$

Preferably, it is the absolute value |I(z,w)| of the focused amplitude that is used.

Corrected images are then obtained that can be used to detect and characterise the defects of the material (step S6), with an improved highlighting of the defects, and a better characterisation of the latter thanks to the correction proposed.

Figure 3A:
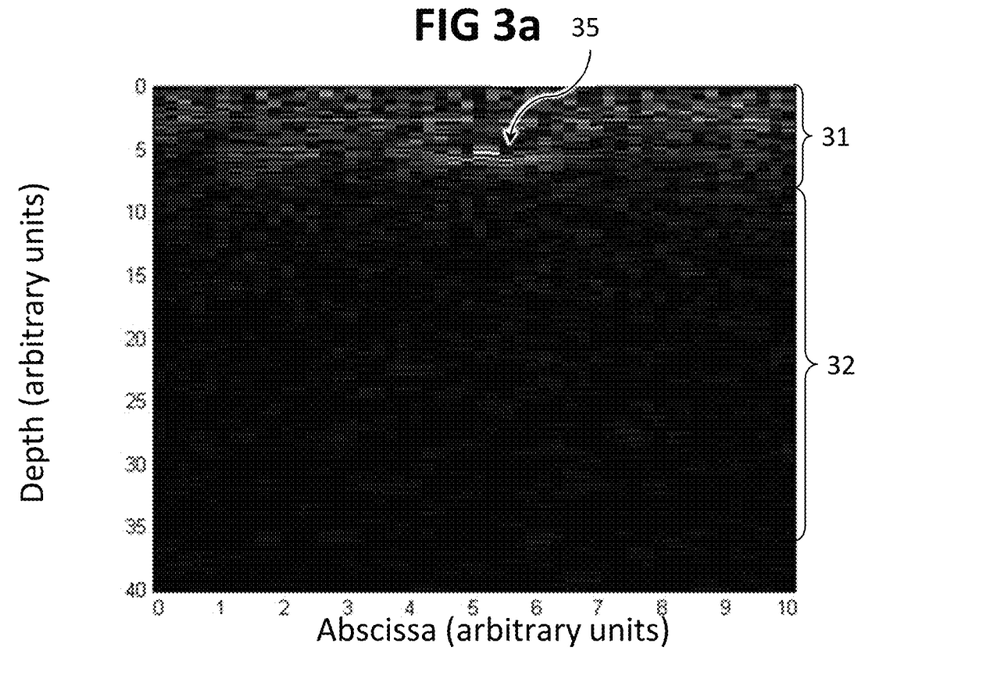
FIG. 3a is an example of an image resulting from the implementation of a total focusing method on a heterogeneous material, before the implementation of the correction proposed by the invention.
Figure 3B:
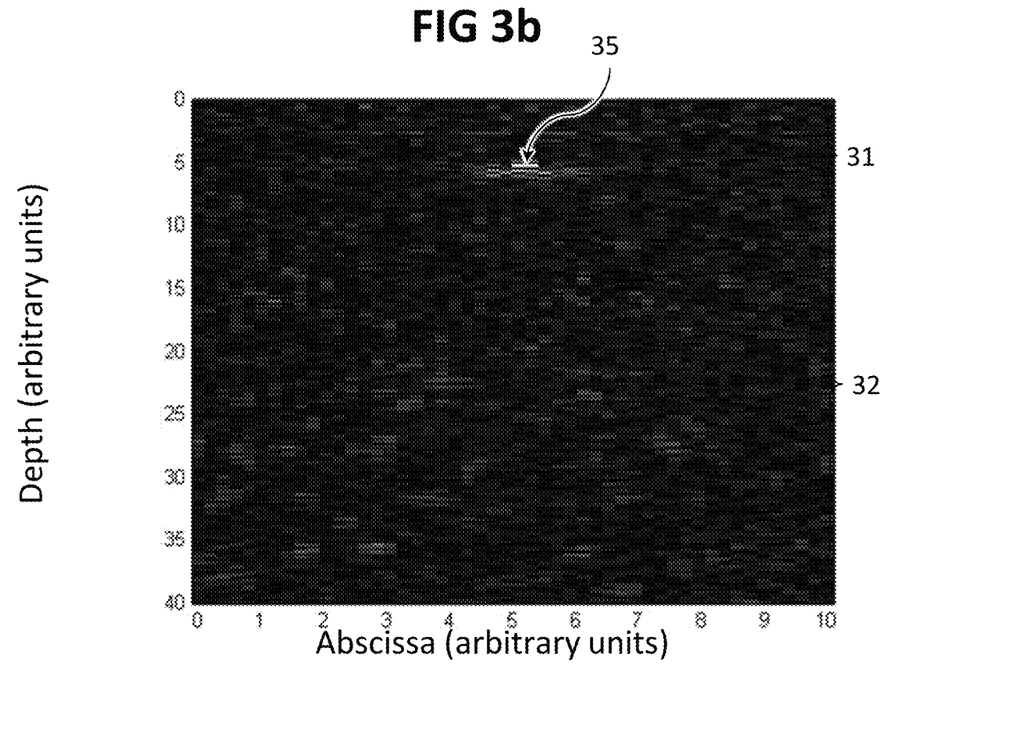
FIG. 3b is an example of an image corrected by the implementation of the correction proposed on the image of FIG. 3a, FIG. 3c is an example of a filtered image resulting from a spatial filtering using a bilateral filter on the corrected image of FIG. 3b.

FIGS. 3a and 3b show the implementation of the normalisation on an example of an image coming from a TFM for a position z of the multi-element probe 1. These images come from measurements on a model that has a defect 13 of 0.5 mm in diameter located at a depth of 5 mm. The vertical axis represents the depth (in arbitrary units), and the horizontal axis the abscissa (in arbitrary units). In these figures, a dark shade indicates a low value, while a light shade indicates a high value. As this is a single image therefore corresponding to a single position z of the multi-element probe 1, the focused amplitude I(z,w) can be simply noted as I(w). Likewise, the corrected amplitude can be noted $I_c(w)$. In the examples that follow, the position of a probed point w being located by an abscissa a and a depth p, the focused amplitude can be noted as I(a, p) and the corrected amplitude as $I_c(a, p)$ FIG. 3a is therefore an example of an image, before the implementation of the correction. It is observed that the image has a fast gradient from the top of the image, corresponding to the surface 11, from high values (light shades) to lower values (dark shades), in such a way that the image can be divided into two parts: a top part 31 having light shades, and a bottom part 32 having only dark shades. The presence of the defect 13 in the material is materialised by a light zone 35 in the top part 31, which however is hardly distinguishable from the light shades of this top part 31.

FIG. 3b is an example of a corrected image corresponding to the image of FIG. 3a after implementation of the proposed correction. In comparison with the image of FIG. 3a, it is observed that the top part 31 is no longer distinguishable from the top part 32. The gradient of shades has indeed disappeared from the top part 31, while isolated light zones and of a low extent have appeared in the top part 31 as well as in the bottom part 32, which therefore no longer has only dark shades. On the other hand, the light zone 35 corresponding to the presence of the defect 13 is now clearly distinguished in the top part. The proposed correction has therefore made it possible to highlight the presence of the defect in the top part 31. Furthermore, the modification of the amplitudes corrected in the bottom part 32 made it possible to ensure the absence of a defect in this bottom part 32. Indeed, the presence of a possible defect in the bottom part 32 would not have appeared in the image of FIG. 3a due to the fact that the focused amplitudes would have been so low that they would not have been distinguished from the structure noise. The method of correction would have made it possible to highlight any defect, as shown by the isolated light zones and of low extent appearing in the bottom part 32.

There still remains however detecting and characterising the defects by detecting their signature in the derived signal. In this respect, the detecting and the characterising of defects is preferably carried out from the image. Defects such as gashes can extend over several tens of millimetres. The points of the image at this defect thus have not only corrected amplitudes that are higher than the points that surround them, but their amplitudes are intercorrelated with each other, i.e. they have a coherence over several spatially adjacent positions at the defect. On the other hand, in the absence of a signature of a defect in an image, with solely the noise, the image has a much lower inter-correlation around any point whatsoever. Thus, each gash can be detected by a spatial persistence on the image according to the abscissa and/or the depth where it appears.

This spatial coherence is therefore used to highlight the useful signal representative of the defects to the detriment of the noise, less spatially correlated. A spatial filtering using this spatial correlation can therefore be implemented on the corrected image, by applying a spatial filter to the corrected image so as to filter it spatially. The spatial filter is designed to attenuate the variability of the structure noise, characterised by the spatial standard deviation of the distribution of its amplitudes, while still retaining the level of the signature of a defect which is revealed in the corrected amplitude of the corrected image.

The filter is said to be spatial since it does not involve any time considerations, the corrected image having corrected amplitudes that vary spatially, without time variation. The spatial filter can be a one-dimensional filter applied on the component of abscissa a, i.e. for each depth p the corrected amplitudes $I_c(a)$ are filtered, and/or on the depth component p, i.e. for each abscissa a the corrected amplitudes $I_c(p)$ are filtered.

The spatial filter can be a low-pass filter. The spatial cut-off frequency of the spatial low-pass filter can be chosen according to the minimum size $\Delta L_{min}$ of the defects that are sought to be detected, as being the inverse of this minimum size $\Delta L_{min}$. Thus, to detect defects of at least 10 mm, the spatial cut-off frequency is therefore chosen as being less than 100 m$^{-1}$. The spatial filter is typically a Butterworth filter.

The spatial filter can also be a two-dimensional spatial low-pass filter applied on the corrected image. The frequency response in two dimensions can be chosen according to the minimum size of the defects sought, likewise for a uni-dimensional spatial filter. The spatial filter can also be a median filter.

It is also possible to use a bilateral filter as a spatial filter, which makes it possible to average the focused amplitude values of neighbouring pixels only if these values are close. This makes it possible to smooth the noise without decreasing the average amplitude of a possible defect, thus increasing the contrast of the image and highlighting the possible defect. Implementing the proposed correction is then particularly advantageous since it makes it possible to homogenise the variability of the noise over the entire corrected image.

Figure 3C:
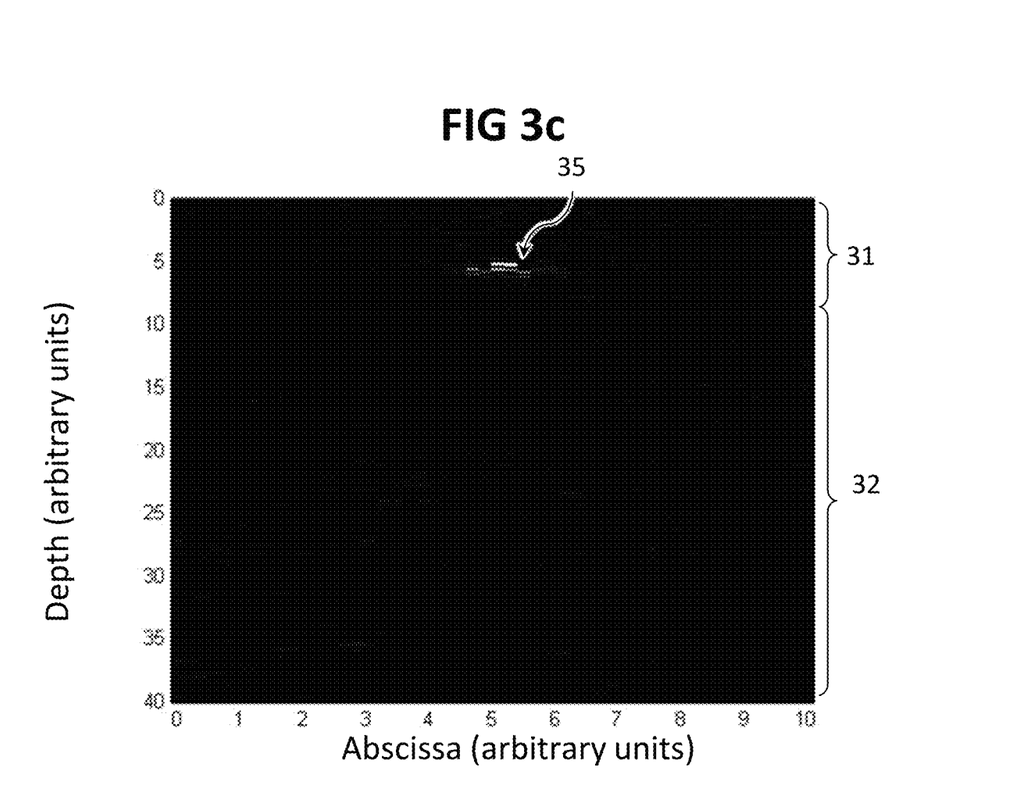

FIG. 3c is an example of a filtered image resulting from a spatial filtering using a bilateral filter on the corrected image of FIG. 3b. It is observed that the light zone 35 corresponding to the presence of the defect 13 is the only information present in the filtered corrected image, as all the noise has been eliminated by the spatial filtering. The corrected image thus filtered makes it possible to obtain a detection map of the defects. Indeed, the signature appears on the corrected image, in particular via a different corrected amplitude of the surroundings, which makes it possible to detect them, but also to locate them. Indeed, a corrected image is a spatial representation, and each point is located via its depth and its abscissa.

A simple method of detection consists of using a given threshold: any exceeding of the threshold by a set of adjacent probed points w on the corrected image signals the presence of a defect. Other more complex methods can of course be implemented.

The method described is typically implemented by a computer provided with a processor and a memory. For this purpose, a computer program product is proposed comprising program code instructions recorded on a non-transitory tangible medium that can be read by a computer for the execution of the method according to any preceding claim, when said program is executed on a computer.

The invention is not limited to the embodiment described and represented in the accompanying figures. Modifications remain possible, in particular from the point of view of the constitution of the various elements or through substitution of technical equivalents, without however leaving the protective scope of the invention.

The invention claimed is:

1. A method for ultrasonic detection and characterization of defects in a heterogeneous material, comprising the following steps:
   a) for each of a plurality of positions at the surface of the material,
      a multi-element probe comprising a plurality of transducers is disposed at the position at the surface of the material;
      for a plurality of different configurations of the multi-element probe, ultrasound is emitted by at least one emitting transducer and at least one receiving transducer acquires a measurement signal representative of the amplitude of the ultrasound propagated in the material as a function of the time for this probe configuration at this position, the different configurations being distinguished from one another by different delays applied to the emission of ultrasonic waves by the transducers or by emitter or receiver functions fulfilled by different transducers,
   b) implementing a focusing algorithm on a measurement data set grouping together the measurement signals for the different configurations of the multi-element probe for each position of the multi-element probe, and obtaining for each probe position an image in which each pixel of the image represents a probed point of the material with which a focused amplitude is associated for said probed point on different probe positions,
   c) for each probed point, determining a measurement of central tendency of the focused amplitude at the probed point on different probe positions,
   d) for each probed point, determining a function representative of the variability of the focused amplitude at this probed point on different probe positions,
   e) for each image, correcting the focused amplitude at each probed point by subtracting the measure of central tendency from the amplitude and by dividing by the function representative of the variability, in order to obtain corrected images,
   f) detecting and characterizing defects in the material based on the corrected images.

2. The method according to claim 1, wherein the different configurations can be distinguished from one another by emitter or receiver functions fulfilled by different transducers, and the focusing algorithm is a total focusing algorithm.

3. The method according to claim 1, wherein the different configurations can be distinguished from one another by different temporal offsets between transducers applied to the emission of ultrasonic waves by the transducers, and the focusing algorithm is a plane wave imaging.

4. The method according to claim 1, wherein the measure of central tendency is an average or a median.

5. The method according to claim 4, wherein the measure of central tendency is an average A(w) having general formula:

$$A(w) = \beta \left( \sum_{i=1}^{N_s} \sum_{w_j \in V_w} I(z_i, w_j) \right)$$

with $N_s$ a number of images of different probe positions z taken into account, Ns being greater than 2, $V_w$ a set of points around the point w that can be reduced to the point w, $I(z_i, w_j)$ being the amplitude or the absolute value of the focused amplitude at the probe position $z_i$ for the point $w_j$.

6. The method according to claim 5, wherein $$\beta = \frac{1}{N_s} \text{ or } \beta = \frac{1}{N_s} \frac{1}{N_V}$$

or $\beta=1$, with $N_v$ the cardinal of the set of points $V_w$.

7. The method according to claim 1, wherein the measure of central tendency is an average A(w) having general formula:

$$A(w) = \frac{1}{N_s} \frac{1}{N_V} \sum_{i=1}^{N_s} \sum_{w_j \in V_w} |I(z_i, w_j)|$$

with $N_s$ a number of images of different probe positions taken into account, Ns being greater than 2, $V_w$ a set of points around the point w that can be reduced to the point w, $I(z_i, w_j)$ being the amplitude at the probe position $z_i$ for the probed point $w_j$, and $N_v$ the cardinal of the set of points $V_w$.

8. The method according to claim 1, wherein the function B(w) representative of the variability of the amplitude for this probed point w on the different probe positions, has general formula:

$$B(w) = \left( \beta' \sum_{i=1}^{N'_s} \sum_{w_j \in V'_w} |I(z_i, w_j) - A(w)|^{\alpha'} \right)^{\gamma'}$$

with $\alpha'$, $\beta'$ and $\gamma'$ different from zero, $N_s'$ a number of images of different probe positions z $V_w'$ a set of points around the point w that can be reduced to the point w, and A(w) the measure of central tendency.

9. The method according to claim 8, wherein
either A(w) is the average, or A(w) is the median over the set of points $V_w$, and
either $\alpha'=2$ and $\gamma'=0.5$, or $\alpha'=1$ and $\gamma'=1$, and $$\beta' = \frac{1}{N'_s} \text{ or } \beta' = \frac{1}{N'_s - 1} \text{ or } \beta' = \frac{1}{N'_s} \frac{1}{N'_V}$$

or $\beta'=1$, with $N_s'$ the number of positions z taken into account, $N_s'$ being greater than 2, and $N_v'$ the cardinal of the set $V_w'$ of points around the point w.

10. The method according to claim 1, wherein the function B(w) representative of the variability of the amplitude at this probed point w on the different probe positions z has general formula:

$$B(w) = \sqrt{\frac{1}{N_s} \frac{1}{N_V} \sum_{i=1}^{N_s} \sum_{w_j \in V_w} ||I(z_i, w_j)| - A(w)|^2}$$

with $N_s$ a number of images of different probe positions, $V_w$ a set of points around the probed point w that can be reduced to the probed point w, $I(z_i, w_j)$ being the focused amplitude at the probe position $z_i$ for the probed point $w_j$, $N_v$ the cardinal of $V_w$, and A(w) a measure of central tendency of the focused amplitude at the probed point on different probe positions.

11. The method according to claim 1, wherein the detection of defects comprises a step of spatial filtering of at least one corrected image by means of a bilateral filter, and of comparing with a threshold.

12. A computer program product comprising program code instructions recorded on a non-transitory tangible medium that can be read by a computer for the execution of the steps b) to f) of the method according to claim 1, when said program is executed on a computer.

* * * * *